US010952084B2

(12) United States Patent
Damnjanovic et al.

(10) Patent No.: US 10,952,084 B2
(45) Date of Patent: Mar. 16, 2021

(54) INTERFERENCE MANAGEMENT FOR SPECTRUM SHARING

(71) Applicant: QUALCOMM Incorporated, San Diego, CA (US)

(72) Inventors: Aleksandar Damnjanovic, Del Mar, CA (US); Yisheng Xue, San Diego, CA (US); Xiaoxia Zhang, San Diego, CA (US); Jing Sun, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 37 days.

(21) Appl. No.: 16/292,254

(22) Filed: Mar. 4, 2019

(65) Prior Publication Data
US 2019/0281475 A1    Sep. 12, 2019

Related U.S. Application Data

(60) Provisional application No. 62/640,308, filed on Mar. 8, 2018.

(51) Int. Cl.
| | |
|---|---|
| *H04W 24/02* | (2009.01) |
| *H04W 16/14* | (2009.01) |
| *H04W 72/04* | (2009.01) |
| *H04W 92/20* | (2009.01) |
| *H04W 74/00* | (2009.01) |
| *H04W 72/08* | (2009.01) |

(52) U.S. Cl.
CPC ......... *H04W 24/02* (2013.01); *H04W 16/14* (2013.01); *H04W 72/0446* (2013.01); *H04W 72/042* (2013.01); *H04W 72/082* (2013.01); *H04W 74/006* (2013.01); *H04W 92/20* (2013.01)

(58) Field of Classification Search
CPC ..................................................... H04W 24/02
USPC ......................................................... 370/328
See application file for complete search history.

(56) References Cited

U.S. PATENT DOCUMENTS

| | | | |
|---|---|---|---|
| 2014/0133430 A1* | 5/2014 | Yang ..................... | H04L 5/0055 370/329 |
| 2016/0182134 A1 | 6/2016 | Kol et al. | |
| 2017/0034670 A1 | 2/2017 | Zhang et al. | |
| 2017/0222842 A1* | 8/2017 | Si ........................ | H04L 27/2613 |
| 2018/0191545 A1* | 7/2018 | Liu ........................... | H04L 7/06 |

OTHER PUBLICATIONS

International Search Report and Written Opinion—PCT/US2019/020833—ISA/EPO—dated May 2, 2019.

\* cited by examiner

*Primary Examiner* — Peter G Solinsky
(74) *Attorney, Agent, or Firm* — Qualcomm Incorporated

(57) ABSTRACT

Methods and apparatus related to interference management for a spectrum (e.g., unlicensed band) shared among multiple wireless communication devices (e.g., user equipment or base stations). A first wireless communication device may generate and transmit to a second wireless communication device an indication that facilitates interference management (e.g., interference estimation, suppression, and/or mitigation). For example, an interfering device may indicate its transmission characteristics to an interfered device to facilitate receiver-side interference suppression, or an interfered device may indicate its reception characteristics to an interfering device to facilitate transmitter-side interference mitigation.

30 Claims, 14 Drawing Sheets ns, or au<br>

INTERFERENCE MANAGEMENT FOR SPECTRUM SHARING

PRIORITY CLAIM AND CROSS REFERENCE TO RELATED APPLICATIONS

This application claims the benefit of priority of U.S. Provisional Application No. 62/640,308, entitled "Interference Management for Spectrum Sharing" and filed on Mar. 8, 2018. The above identified application/document is expressly incorporated by reference in entirety herein as part of the disclosure of this application.

BACKGROUND

This disclosure relates generally to wireless communications systems, and specifically to interference management for spectrum sharing (e.g., to methods and apparatus for managing interference to a user equipment (UE) associated with a first operator network caused by an interfering entity associated with a second operator network in a shared spectrum environment).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Multiple wireless communication devices (e.g., user equipment or base stations) may share a spectrum (e.g., unlicensed frequency band) for communication, thus potentially causing interference among them. A first wireless communication device may generate and transmit to a second wireless communication device an indication that facilitates interference management (e.g., interference estimation, suppression, and/or mitigation). For example, an interfering device may indicate its transmission characteristics to an interfered device to facilitate receiver-side interference suppression, or an interfered device may indicate its reception characteristics to an interfering device to facilitate transmitter-side interference mitigation.

In an aspect, a method of wireless communication by a first wireless communication apparatus is provided. An indication may be generated that facilitates interference management for a spectrum shared by the first wireless communication apparatus and a second wireless communication apparatus. The first wireless communication apparatus may transmit the indication to the second wireless communication apparatus.

In another aspect, a first wireless communication apparatus is provided. The apparatus may include a memory and at least one processor coupled to the memory. The at least one processor is configured to generate an indication that facilitates interference management for a spectrum shared by the first wireless communication apparatus and a second wireless communication apparatus. The at least one processor may be further configured to transmit the indication to the second wireless communication apparatus.

In another aspect, a first wireless communication apparatus is provided. The first wireless communication apparatus may include means for generating an indication that facilitates interference management for a spectrum shared by the first wireless communication apparatus and a second wireless communication apparatus. The first wireless communication apparatus may further include means for transmitting the indication to the second wireless communication apparatus.

In another aspect, a non-transitory computer-readable medium having instruction stored thereon is provided. The instructions may include codes executable for a first wireless communication apparatus to perform generating an indication that facilitates interference management for a spectrum shared by the first wireless communication apparatus and a second wireless communication apparatus. The instructions may further include codes for transmitting the indication to the second wireless communication apparatus.

In various aspects, the first wireless communication apparatus may be an interferer to the second wireless communication apparatus over the spectrum. The indication may include one or more parameters on transmission characteristics of the first wireless communication apparatus. For example, the one or more parameters may include at least one of a configuration of reference signal transmission, a channel occupation time of data transmission, or a modulation order of data transmission, by the first wireless communication apparatus. Furthermore, the one or more parameters may facilitate receiver-side interference suppression by the second wireless communication apparatus.

In various aspects, the second wireless communication apparatus may be an interferer to the first wireless communication apparatus over the spectrum. The indication may include one or more parameters on reception characteristics of the first wireless communication apparatus. For example, the one or more parameters may include an interference suppression capability of the first wireless communication apparatus. Furthermore, the one or more parameters may facilitate transmitter-side interference mitigation by the second wireless communication apparatus.

In various aspects, the indication may comprise a timing synchronization preamble.

Other aspects, features, and embodiments of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

DETAILED DESCRIPTION

Figure 1A:
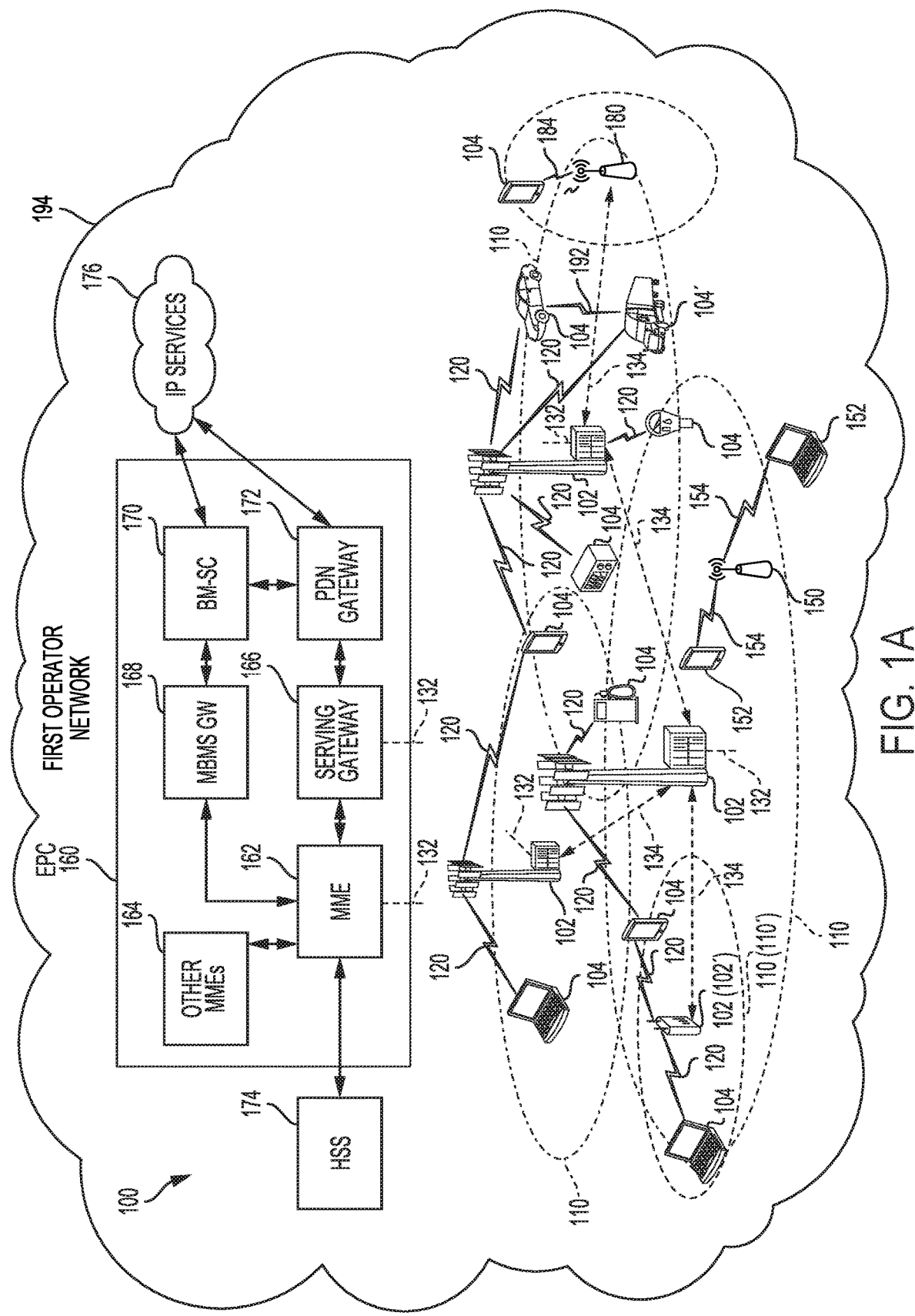
FIG. 1A illustrates an example of a first wireless communication system in accordance with various aspects of the present disclosure.

Multiple wireless communication devices (e.g., user equipment or base stations) may share a spectrum (e.g., unlicensed frequency band) for communication, thus potentially causing interference among them. To manage interference and control channel access, various techniques based on listen-before-talk (LBT) are often adopted to help multiple devices (some of which may belong to different operators or use different radio access technologies) coexist in the shared spectrum. However, LBT do not always work well. For example, some transmitter-based LBT methods (e.g., energy-based clear channel assessment in LTE Licensed Assisted Access) may not silence some interferers, for example, because one operator's base stations may not be able to detect another operator's base stations and hence may interfere (or jam) UEs from the later operator. On the other hand, some receiver-based LBT methods (e.g., Request to Send (RTS)/Clear to Send (CTS) in Wi-Fi) may silence more nodes than necessary, thus limiting overall system capacity.

A new approach to interference management for shared spectrum, potentially augmenting LBT, is thus desired to further enhance spectrum utilization and user experience. As described in detail herein, interfering and/or interfered devices may signaling each other to coordinate interference management. In particular, a first wireless communication device may generate and transmit to a second wireless communication device an indication that facilitates interference management (e.g., interference estimation, suppression, and/or mitigation). For example, an interfering device may indicate its transmission characteristics to an interfered device to facilitate receiver-side interference suppression, or an interfered device may indicate its reception characteristics to an interfering device to facilitate transmitter-side interference mitigation.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the disclosure or the claims.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

As used herein, the terms "user equipment" and "mobile communication device" are used interchangeably and refer to any one or all of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices that include a programmable processor, memory, and circuitry for connecting to at least two mobile communication networks. The various aspects may be useful in UEs, such as smart phones, and so such devices are referred to in the descriptions of various aspects.

FIG. 1A is a diagram illustrating an example of a first wireless communication system 100 in accordance with various aspects of the present disclosure. The wireless communication system (also referred to as a wireless wide area network (WWAN)) includes a wireless communication apparatuses, such as base stations 102 and UEs 104, and includes an Evolved Packet Core (EPC) network 160. The base stations 102 may include macro cells (high power cellular base station) and/or small cells (low power cellular base station). The macro cells include base stations. The small cells include femtocells, picocells, and microcells.

The base stations 102 (collectively referred to as an access network 110, such as an Evolved Universal Mobile Telecommunications System (UMTS) Terrestrial Radio Access Network (E-UTRAN)) interface with the EPC network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth, for example, per carrier allocated in a carrier aggregation of up to a total of Yx MHz (x component carriers), used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In aspects, the wireless communication system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station (e.g., a gNodeB (gNB)) 180, for example, may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), wireless communication apparatus, or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, wireless communication apparatus, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

In aspects, NR UEs may be considered Enhanced Mobile Broadband (eMBB) UEs employing service targeting wide bandwidth (e.g., 80 megahertz (MHz) and beyond). In aspects, such service may include, for example, voice, messaging and/or video streaming services similar to LTE communication. Additionally or alternatively, NR UEs may be considered millimeter wave (mmW) UEs targeting high carrier frequency (e.g., 60 gigahertz (GHz)) communication. Additionally or alternatively, NR UEs may be considered ultra reliable and low latency communications (URLLC) UEs using mission critical URLLC service. In aspects, such service may include, for example, factory automation, robotics, remote surgery, and/or autonomous driving. Additionally or alternatively, NR UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices. Additionally or alternatively, NR UEs may be considered massive MTC (mMTC) UEs targeting non-backward compatible MTC techniques.

It is noted that while aspects may be described herein using terminology commonly associated with 3G and/or 4G wireless technologies, aspects of the present disclosure can be applied in other generation-based communication systems, such as 5G and later, including NR technologies.

In some aspects, wireless communication apparatuses may support URLLC services (e.g., over TDD). URLLC services may include transmission and reception of URLLC data. Such transmissions and receptions may often have low latency and high reliability requirements. Unfortunately, the nominal structure of an enhanced mobile broadband (eMBB) TDD subframe has several fundamental limitations that restrict the reliability and latency achievements that can be obtained. For example, although a nominal TDD subframe may be self-contained, in that it may contain a downlink (DL) interval and an uplink (UL) interval, in the nominal TDD subframe structure only one direction in downlink or uplink may be active at any time. This feature creates a self-blocking characteristic in the nominal TDD subframe structure. Thus, during uplink intervals, no downlink transmissions are possible. Similarly, during downlink intervals, no uplink transmissions are possible.

In aspects, the first wireless communication system 100 may be associated with a first mobile operator network 194. In aspects, one or more portions of the first wireless communication system 100 may operate over a shared channel or a shared communication medium, which may include a licensed spectrum, a shared spectrum, and/or an unlicensed spectrum, and may support dynamic medium sharing. For example, the frequency spectrum used by one or more wireless communication apparatuses and/or any other component in the first wireless communication system 100 may be shared with other wireless communication apparatuses, for example, which are not associated with the first wireless communication system 100. In some cases, first wireless communications system 100 may utilize both licensed and unlicensed radio frequency spectrum bands. For example, the first wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in such licensed or unlicensed radio frequency spectrum bands, wireless communication apparatuses, such as base stations 102, 102', 180 and UEs 104, 104' may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Existing spectrum sharing is inefficient though. For example, LBT techniques do not always work well. Transmitter-based LBT procedures, like energy sensing used during LTE LAA operation may not silence appropriate interferers. For example, a first base station, like a gNB, associated with a first operator network may not be able to detect or sense a second base station, like a gNB, associated with a second operator network (e.g., such base stations may not be proximate each other in the communication system topology). However, the second base station may interfere or jam one or more UEs associated with the first base station, and vice versa. Additionally or alternatively, receiver-based LBT procedures, like a WiFi RTS/CTS procedure or protocol, may silence more wireless communication apparatuses than necessary. For example, for a communication, a wireless communication apparatus, like a UE, may receive an RTS signal and broadcast a CTS signal in response thereto. Another wireless communications apparatus, like a gNB, may receive the CTS and forgo a transmission even if such transmission would not have interfered (e.g., due to a direction of the transmission or due to a level of interference the transmission would have contributed to the communication) with the communication. Standardization of such a procedure that may not be suitable and/or optimized for all scenarios.

Improved interference management for spectrum sharing is desired. For example, interference management for spectrum sharing that is suitable and/or optimized across network deployments, that does not require extensive standardization, and/or that provides receiver differentiation (e.g., UE differentiation) are desired. As described below, the present disclosure provides a solution to these, and other problems, by providing methods and apparatus for interference management for spectrum sharing (e.g., methods and apparatus for managing interference to a UE associated with a first operator network caused by an interfering entity associated with a second operator network in a shared spectrum environment). For example, the present methods and apparatuses provide receiver based interference management for LTE U, LTE LAA, NR U and/or NR LAA.

Figure 1B:
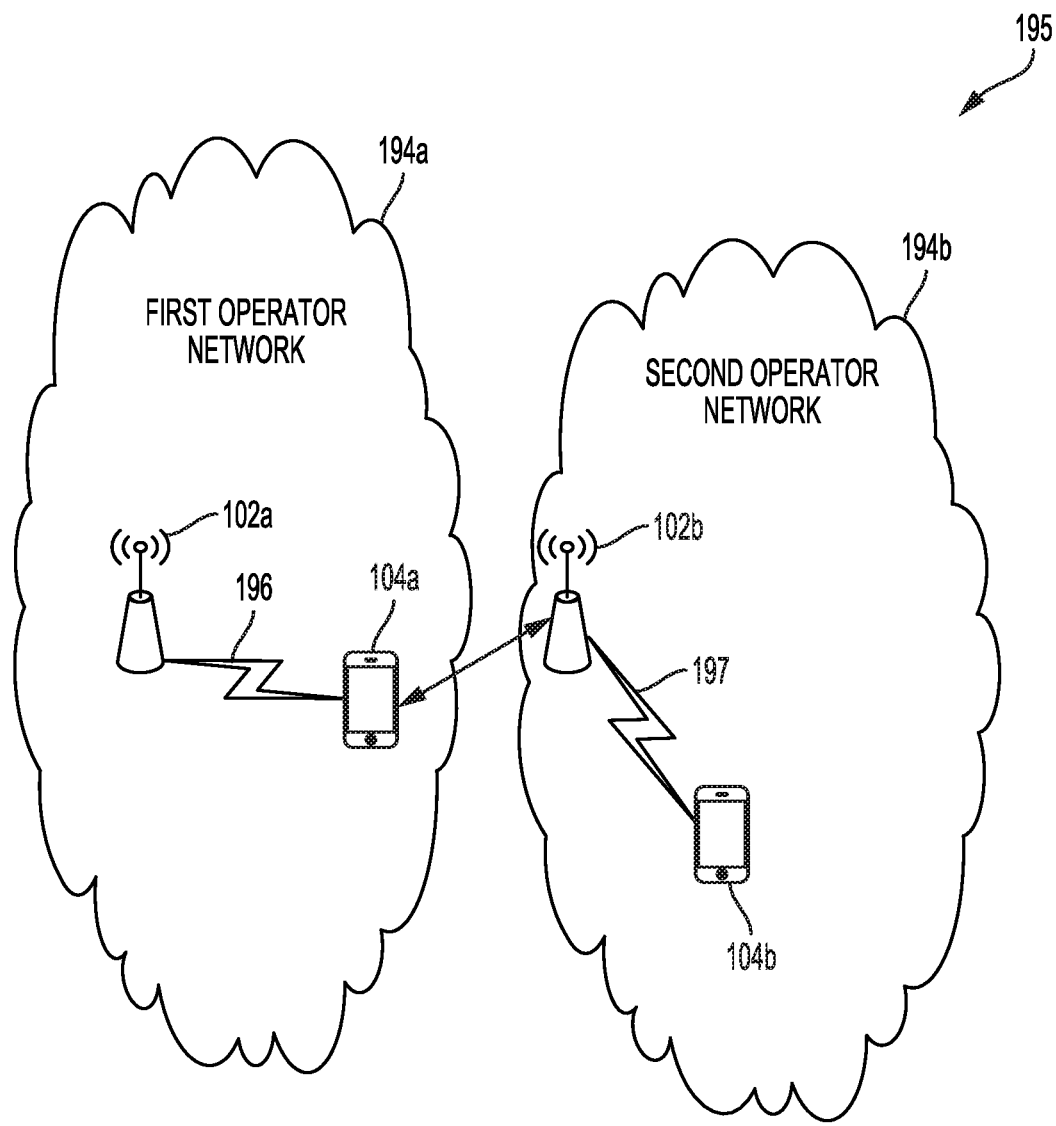
FIG. 1B illustrates an example of a second wireless communication system in accordance with various aspects of the present disclosure in accordance with various aspects of the present disclosure.

FIG. 1B illustrates an example of a second wireless communication system 195 in accordance with various aspects of the present disclosure. The second wireless communication system 195 may be present where wireless communication apparatuses (e.g., UEs and/or base stations) operate in networks of different mobile network operators (MNOs) and/or different frequency spectrums. The second wireless communication system 195 may be associated with and/or include a plurality of mobile telephony or operator networks in accordance with various aspects of the present disclosure. For example, the communication system 195 may be associated with and/or include a first operator network 194a and may be associated with and/or include a second operator network 194b. In aspects, the first operator network 194a and/or the second operator network 194b may be the same as or similar to the first operator network 194 of FIG. 1, although the first operator network 194a and/or the second operator network 194b may have a different configuration. In aspects, the first operator network 194a and the second operator network 194b may be asynchronous. For example, a communication timing of one of the operator networks may be offset from a communication timing of the other operator networks. Each such mobile or operator network 194a, 194b may include one or more cellular base stations 102. A first UE 104a may communicate with a first operator network 194a through the cellular connection 196 to a first base station 102a. A second UE 104b may similarly communicate with the second operator network 194b through the cellular connection 197 to a second base station 102b. The second UE 104b may communicate with the second operator network 194b through the cellular connection 197 to the second base station 102b. The cellular connections 196 and 197 may be made through two-way wireless communication links, such as 4G, 3G, CDMA, TDMA, WCDMA, GSM, and/or other mobile telephony communication technologies.

In aspects, the first operator network 194a and the second operator network 194b may share licensed or unlicensed frequency spectrums. For example, one or more wireless communication apparatuses (e.g., UEs 104, 104', 104a and/or BSs 102, 102', 180) associated with the first operator network 194a and one or more wireless communication apparatuses (e.g., UEs 104, 104', and/or BSs 102, 102a, 180) associated with the second operator network 194b may share a frequency spectrum. In aspects, to reduce and/or avoid problems associated with LBT procedures, a wireless communication apparatus 102a, 104a associated with the first operator network 194a may communicate with an interfering wireless communication apparatus 104b, 102b associated with the second operator network 194b to facilitate interference mitigation in the shared spectrum. For example, wireless communication apparatus 102a, 104a associated with the first operator network 194a may signal an indication to an interfering wireless communication apparatus 104b, 102b associated with the second operator network 194b to facilitate interference management in the shared spectrum. Additionally or alternatively, an interfering wireless communication apparatus 104b, 102b associated with the second operator network 194b may signal an indication to a wireless communication apparatus 102a, 104a (e.g., with which the interfering wireless communication apparatus 104b, 102b interferes) associated with the first operator network 194a to facilitate interference mitigation in the shared spectrum. In aspects, one or more of the wireless communication apparatuses 102a, 104a, 102b, 104b may perform the method 500 to facilitate interference mitigation in the shared spectrum as described below with reference to FIG. 5, the method 600 to facilitate interference mitigation in the shared spectrum as described below with reference to FIG. 6 below, the method 700 to facilitate interference mitigation in the shared spectrum as described below with reference to FIG. 7 below, and/or as otherwise described herein.

Figure 2A:
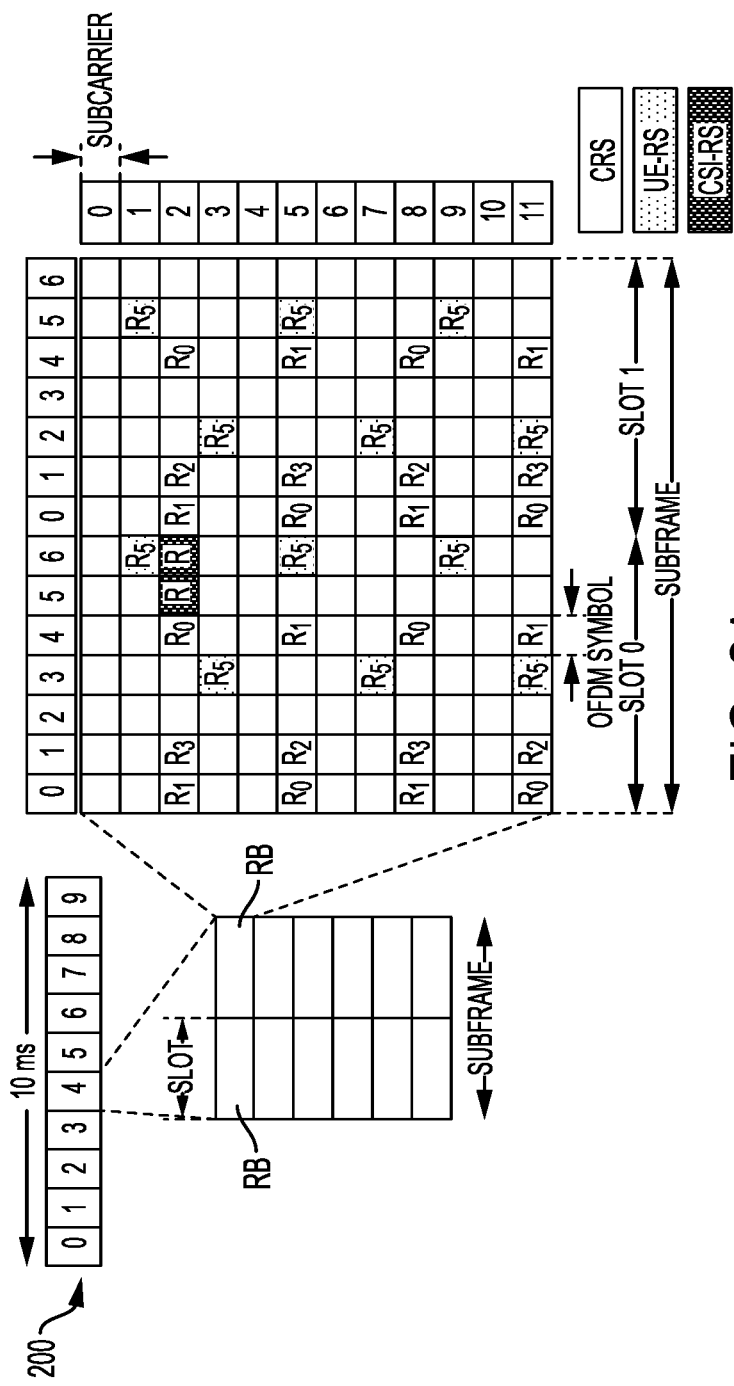
FIGS. 2A, 2B, 2C, and 2D are diagrams illustrating examples of a DL frame structure, DL channels within the DL frame structure, an UL frame structure, and UL channels within the UL frame structure, respectively, in accordance with various aspects of the present disclosure.
Figure 2B:
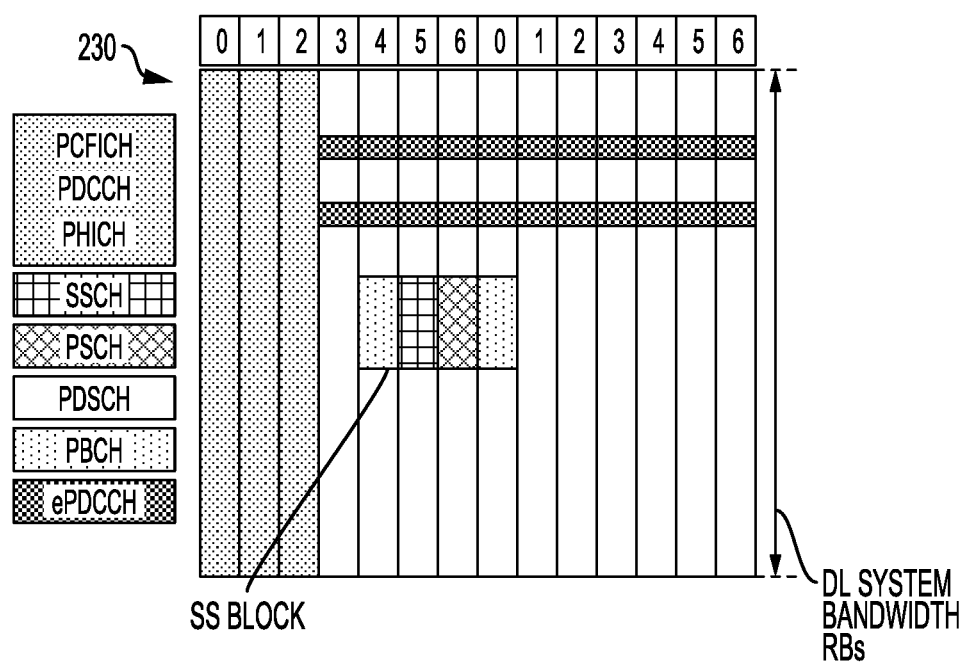
Figure 2C:
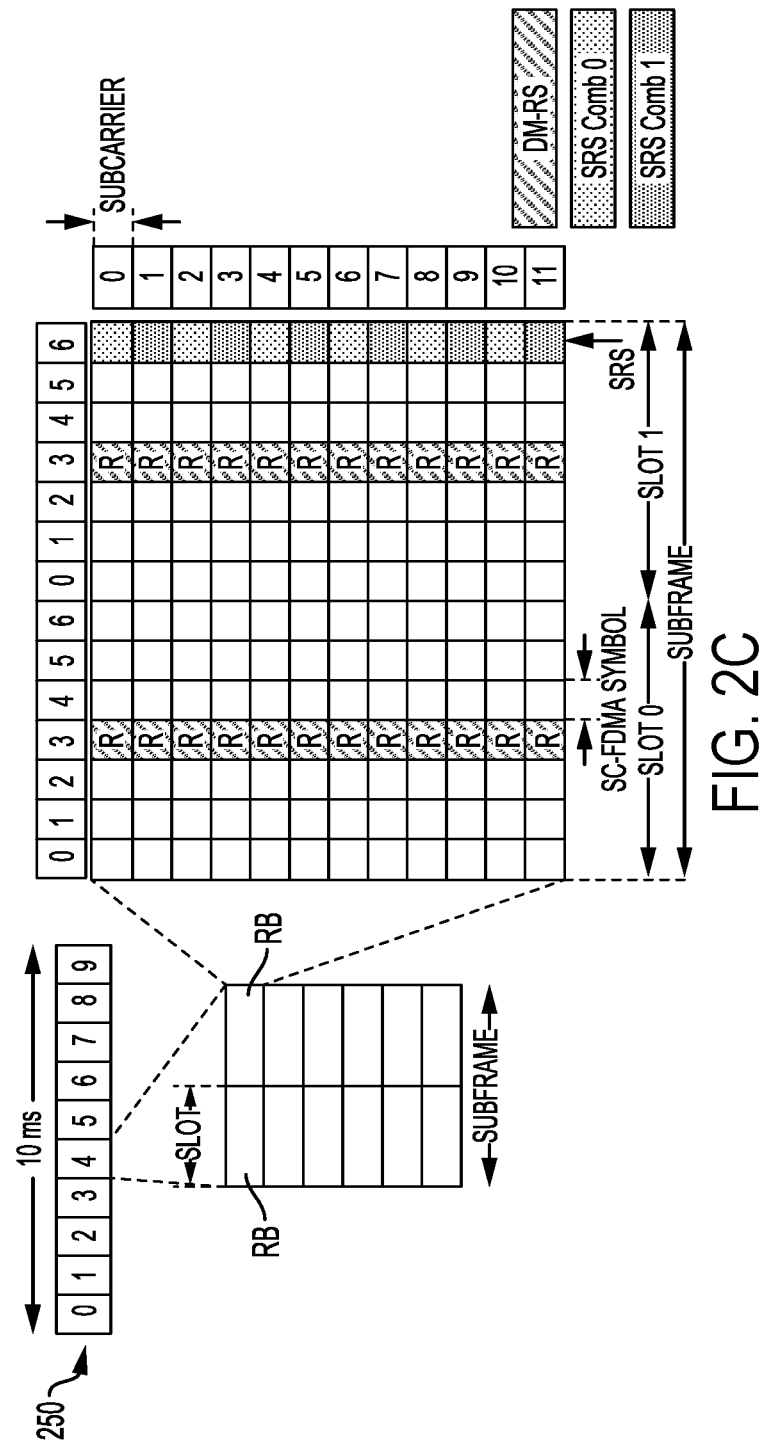
Figure 2D:
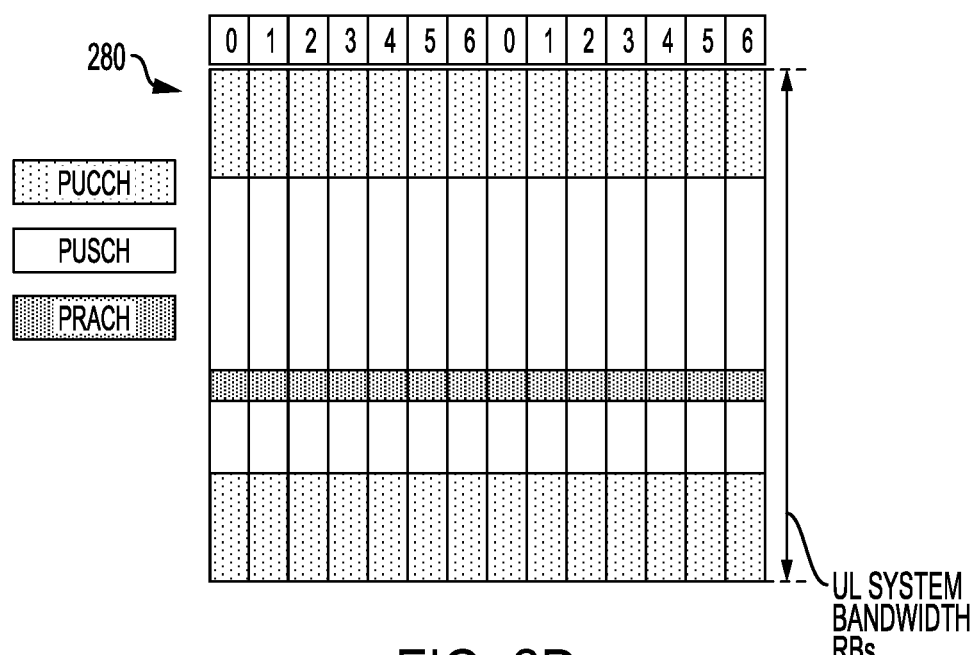

FIG. 2A is a diagram 200 illustrating an example frame structure of one or more downlink (DL) frames in accordance with various aspects of the present disclosure. FIG. 2B is a diagram 230 illustrating an example of channels within the frame structure of a DL frame in accordance with various aspects of the present disclosure. FIG. 2C is a diagram 250 illustrating an example frame structure of one or more uplink (UL) frames in accordance with various aspects of the present disclosure. FIG. 2D is a diagram 280 illustrating an example of channels within the frame structure of a UL frame in accordance with various aspects of the present disclosure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more concurrent resource blocks (RBs) (also referred to as physical RBs (PRBs)). The resource grid is divided into multiple resource elements (REs). For a normal cyclic prefix, an RB contains 12 consecutive subcarriers (e.g., for 15 kHz subcarrier spacing) in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (e.g., also sometimes called common RS), UE-specific reference signals (UE-RS) like demodulation reference signals (DM-RSs), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI. In aspects, the DL frame structure, DL channels within the DL frame structure, the UL frame structure, and/or UL channels within the UL frame structure described with reference to FIGS. 2A, 2B, 2C, and 2D, respectively, may be employed in the first operator network 194a and/or the second operator network 194b.

Figure 3:
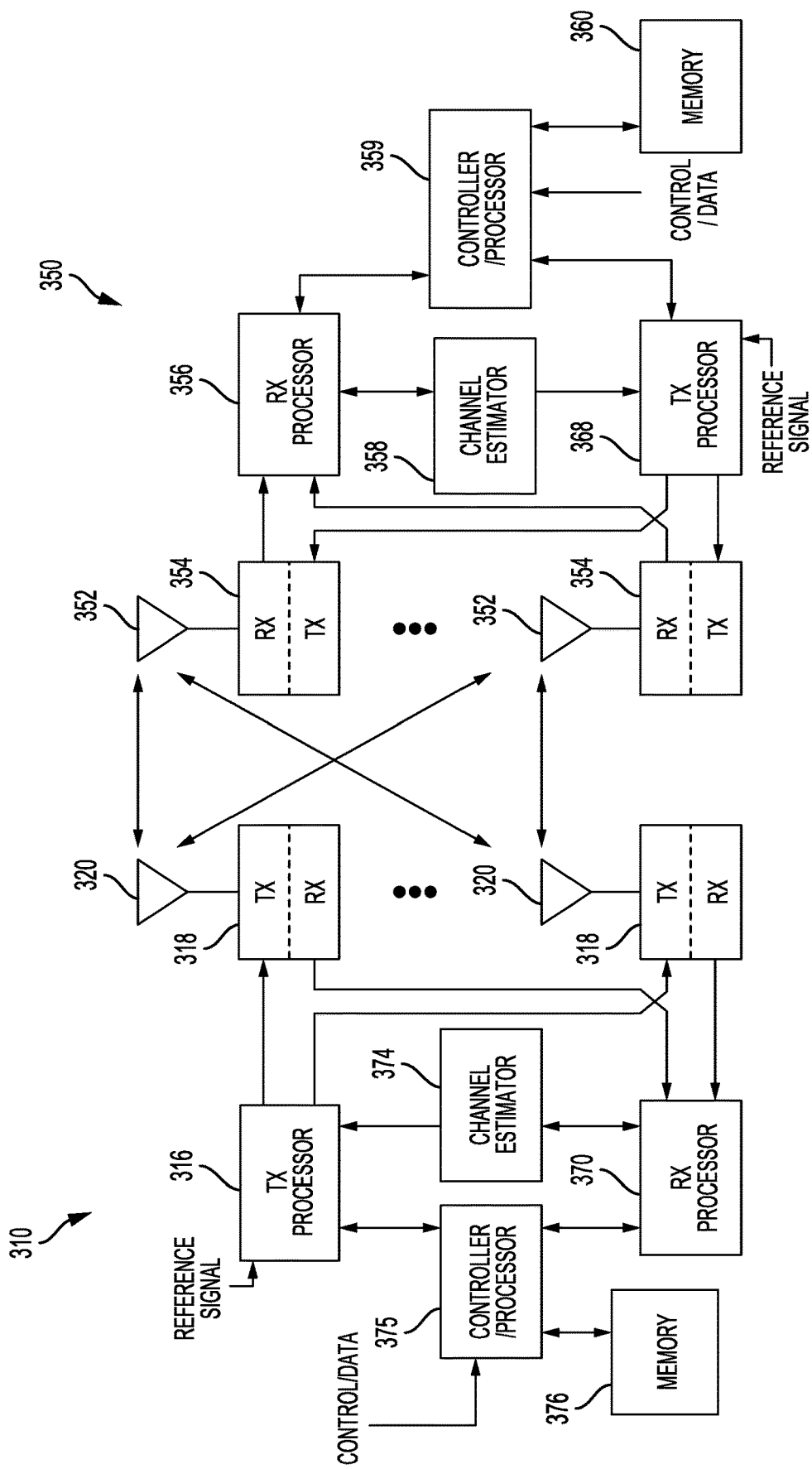
FIG. 3 is a diagram illustrating an example of a base station and user equipment (UE) in accordance with various aspects of the present disclosure.

FIG. 3 is a block diagram of a base station 310 in communication with a UE 350 in accordance with various aspects of the present disclosure. In the DL, IP packets from the EPC network 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

One or more components of UE 350 may be configured to perform methods of interference management for spectrum sharing, as described in more detail elsewhere herein. For example, the controller/processor 359, channel estimator 358, and/or other processors and modules of UE 350 may perform or direct operations of, for example, method 500 of FIG. 5, method 600 of FIG. 6, method 700 of FIG. 7, and/or other methods as described herein. One or more components of base station 310 may be configured to perform methods of interference management for spectrum sharing, as described in more detail elsewhere herein. For example, the controller/processor 375, channel estimator 374, and/or other processors and modules of base station 310 may perform or direct operations of, for example, method 500 of FIG. 5, method 600 of FIG. 6, method 700 of FIG. 7, and/or other methods as described herein. In some aspects, one or more of the components shown in FIG. 3 may be employed to perform example method 500 of FIG. 5, method 600 of FIG. 6, method 700 of FIG. 7, and/or other methods as described herein.

To simplify the discussion, the exemplary methods and apparatus may be discussed within the context of LTE and/or NR. However, one of ordinary skill in the art would understand that the exemplary methods and apparatuses are applicable more generally to a variety of other wireless communication systems.

Figure 4:
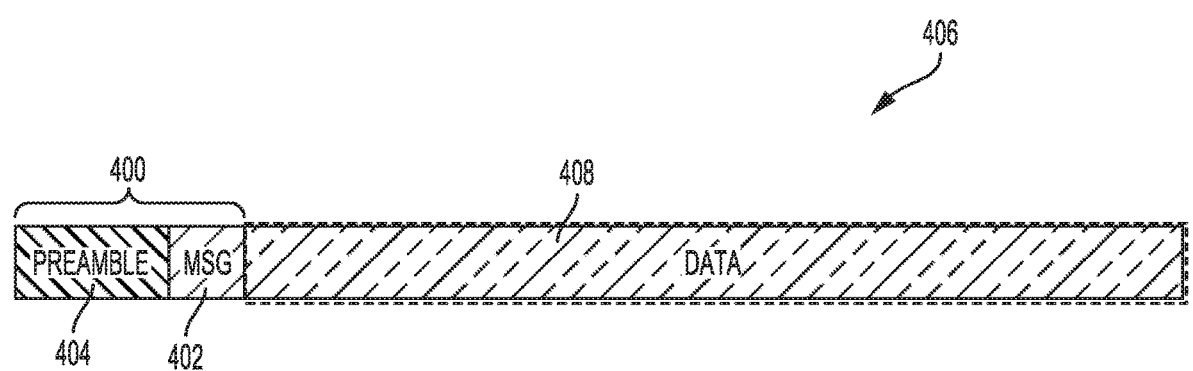
FIG. 4 is a diagram illustrating an example of an indication that facilitates interference management by a wireless communication apparatus in accordance with various aspects of the present disclosure.

FIG. 4 is a diagram illustrating an example of an indication 400 that facilitates interference management by a wireless communication apparatus in accordance with various aspects of the present disclosure. The indication 400 may provide data that assists in channel estimation. Such data-assisted channel estimation is more accurate than blind channel estimation, which is prone to error, and therefore, results in improved interference management. In aspects, the indication 400 may be communicated by a wireless communication apparatus (e.g., to another wireless communication apparatus or from another wireless communication apparatus). For example, the indication 400 may be communicated by a first wireless communication apparatus (e.g., to a second wireless communication apparatus interfering with the first wireless communication apparatus). In such examples, the first wireless communication apparatus may be a UE 104, 104', 104a, 104b, 350 and the second wireless communication apparatus may be a base station 102, 102', 102a, 102b, 310. Alternatively, in such examples, the first wireless communication apparatus may be a base station and the second wireless communication apparatus may be a UE 104, 104', 104a, 104b, 350. In aspects, the first the first wireless communication apparatus may be associated with a first operator network and the second wireless communication apparatus may be associated with a second operator network.

In aspects, the indication 400 may include a message portion 402 that facilitates mitigation of interference by the first wireless communication apparatus caused by the second wireless communication apparatus. The indication 400 may also include a preamble portion 404. The preamble portion may include a preamble or sequence that provides timing synchronization. In aspects, the preamble may be operator-, cell-, or cell identifier-specific. For example, indication may be configured such that the message portion 402 follows the preamble portion 404 after a period of time (e.g., a predetermined period of time). A wireless communication apparatus may detect the preamble while in a low-power mode or state. In this manner, the preamble indicates to the wireless communication apparatus when to decode the message portion 402. Consequently, the wireless communication apparatus does not have to constantly attempt to decode signals. Thus, when a wireless communication device detects the preamble, such wireless communication device becomes aware of a timing associated with the message portion 402 of the indication 400 and may process (e.g., decode) such message (Msg) portion 402. The timing synchronization provided by the preamble portion 404 may be useful for unlicensed shared spectrum operation because such information is not exchanged via backhaul communication. In this manner, a first wireless communication apparatus associated with a first operator network may communicate (e.g., transmit) the indication 400 to a second wireless communication apparatus associated with a second operator network, even if the second operator network is asynchronous from the first operator network, has a different frame timing than the first operator network, and/or has a different frame structure than the first operator network. In this manner, the preamble portion 402 may provide the wireless communication apparatus receiving the indication 400 with timing synchronization (e.g., for the indication). In aspects, the preamble portion 402 may also facilitate or provide the wireless communication apparatus receiving the indication 400 with a time synchronization, such that communications from the first and second wireless communication apparatuses are aligned to a same boundary (e.g., an OFDM symbol boundary). In aspects, the indication 400 may be included in a message 406 that includes a data portion 408. The data portion 408 may include data traffic, for example, associated with a communication by the wireless communication apparatus with another wireless communication apparatus in the same operator network. For example the other wireless communication apparatus in the same operator network may be a wireless communication apparatus serving, or alternatively served by, the wireless communication apparatus transmitting the data portion 408.

In aspects, the first wireless communication apparatus may transmit the indication 400 to the second wireless communication apparatus interfering with the first wireless communication apparatus. In such aspects, the message portion 402 may include an indication of interference mitigation capability. For example, the message portion 402 may signal or indicate an MMSE receiver interference suppression capability of the first wireless communication apparatus, a number of interfering streams the MMSE receiver of the first wireless communication apparatus may suppress, a number of antennas the first wireless communication apparatus has, a rank limitation for the second wireless communication apparatus, and/or a rank to be employed by the second wireless communication apparatus for transmission(s).

Additionally or alternatively, the message portion may include channel occupancy time (COT) associated with the first wireless communication apparatus. The COT may indicate a period of time that a channel is employed for a communication with the first wireless communication apparatus. Such channel may employ one or more portions of a frequency spectrum shared by the first and second wireless communication apparatuses. The second wireless communication apparatus may adjust communication (e.g., with other wireless communication apparatus, for example, in the second operator network) based on the interference mitigation capability and/or COT to reduce interference to the first wireless communication apparatus.

Thus, in aspects, the first wireless communication apparatus may transmit a waveform and/or message that indicates and/or signals an MMSE suppression capability of the first wireless communication apparatus, and potentially a COT (e.g., associated with the first wireless communication apparatus). Thus, in aspects, each receiver can transmit the signal that aids an unintended interfering transmitter to reduce or suppress interference. For example, after receiving the indication 400, the second wireless communication apparatus may adjust a rank, time, frequency, code and/or the like for one or more of its transmissions to reduce interference to the first wireless communication apparatus.

Additionally or alternatively, in aspects, the second wireless communication apparatus, interfering with the first wireless communication apparatus, may transmit the indication 400 to the first wireless communication apparatus. In such aspects, the message portion 402 may include an indication of a user-specific reference signal (UE-RS) (e.g., a demodulation reference signal (DMRS)) port configuration. Additionally or alternatively, in aspects, the message portion 402 may include channel occupancy time (COT) associated with the second wireless communication apparatus. The COT may indicate a period of time that a channel is employed for a communication by the second wireless communication apparatus (e.g., with another wireless communication apparatus, for example, in the second operator network). Such channel may employ one or more portions of a frequency spectrum shared by the first and second wireless communication apparatuses. Thus, in aspects, the second wireless communication apparatus, interfering with a first wireless communication apparatus, may transmit a waveform and/or message, such as the indication 400, that facilitates accurate estimation of interfering channel by the first wireless communication apparatus (e.g., as opposed to treating noise from desired channel estimation as interference) resulting in improved receiver MMSE suppression capability by the first wireless communication apparatus. For example, the user-specific reference signal port configuration and the COT may indicate time and frequency resources used by the second wireless communication apparatus for the interfering transmission. The first wireless communication apparatus may employ techniques such as beam forming to detect and perform channel estimation of the interfering channel. More specifically, the user-specific reference signal port configuration indicates resource elements employed to send the UR-RSs, like DM-RSs. Based on this information, the first wireless communication apparatus may estimate the interfering channel (e.g., using receive beam forming). The first wireless communication apparatus may perform interference mitigation based on the interfering channel estimation thereby improving interference mitigation accuracy.

Additionally or alternatively, in aspects, the message portion 402 may indicate a modulation order of a communication (e.g., the interfering transmission) associated with the second wireless communication apparatuses. Thus, in aspects, the second wireless communication apparatus, interfering with a first wireless communication apparatus, may transmit a waveform and/or message, such as the indication 400, that facilitates estimating or decoding of symbols of an interfering channel (e.g., more efficiently than blind decoding) by the first wireless communication apparatus resulting in improved receiver interference suppression techniques, such as data interference cancellation, as well.

The present methods and apparatus provide improved and/or optimized receiver based interference suppression. For example, the present methods and apparatus provide for signaling from a first wireless communication apparatus serving as a transmitter that improves receiver MMSE suppression capability of a receiving wireless communication apparatus. One or more interferers may transmit such signal that aids a wireless communication apparatus receiving an unintended interfering signal from another wireless communication apparatus to suppress the interference (e.g., with receiver MMSE suppression). In this manner, the transmitter may provide signaling that facilitates MMSE receiver of the other wireless communication apparatus to suppress strong interference.

In aspects, one or more nodes within and across operators may be synchronized. For example, the interfering wireless communication apparatus may be time synchronization with the wireless communication apparatus with which it interferes. In such aspects, interference, from an interfering wireless communication apparatus, to a wireless communication apparatus may be OFDM symbol synchronized with transmission of a desired signal for wireless communication apparatus. Such time synchronization may provide improved or better results for MMSE suppression and/or other forms of suppression by the wireless communication apparatus experiencing interference. For example, such wireless communication apparatus may not have to deal with timing offset. Furthermore, such time synchronization may allow for more interference management choices or procedures than those allowed without the time synchronization. In aspects, time synchronization may include having an OFDM symbol boundary of an interfering signal aligned with an OFDM symbol boundary of the transmission of the desired signal.

Figure 5:
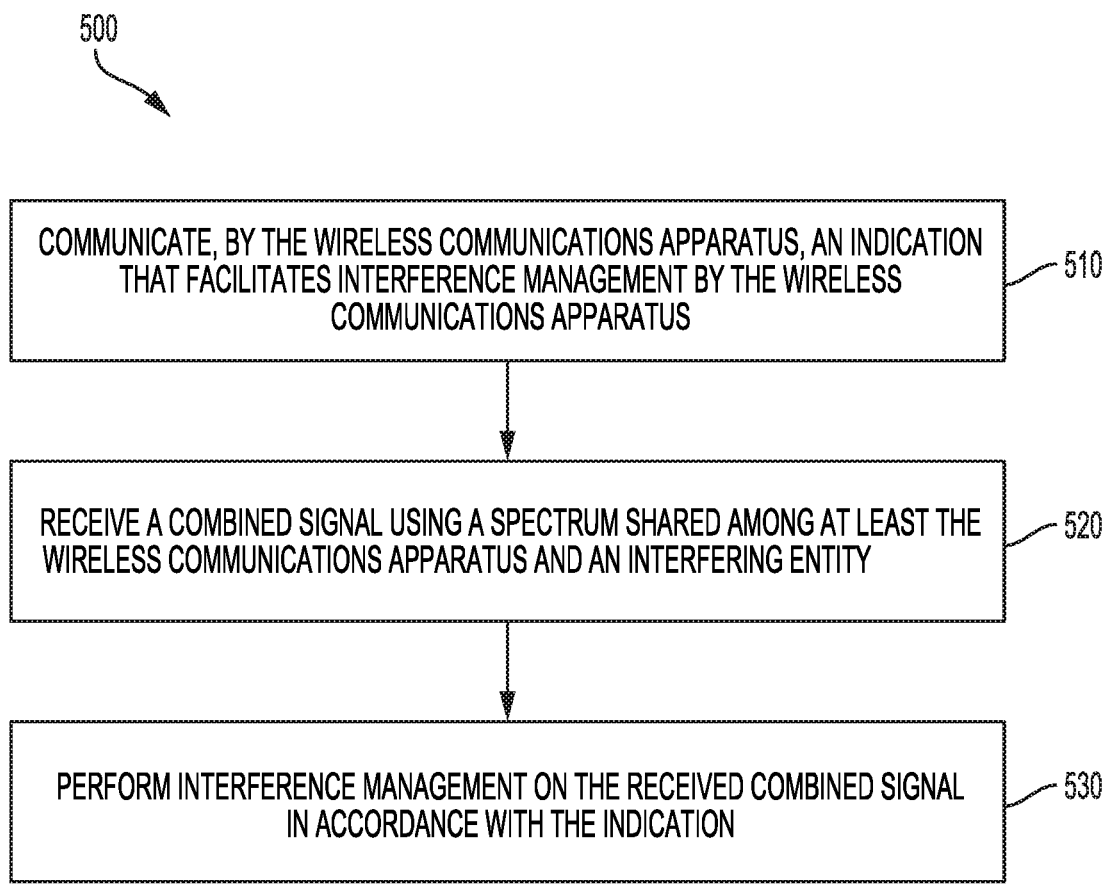
FIG. 5 is a flow diagram of a method to facilitate interference mitigation in the shared spectrum in accordance with various aspects of the present disclosure.

FIG. 5 is a flow diagram of a method to facilitate interference mitigation in a shared spectrum in accordance with various aspects of the present disclosure. Steps of the method 500 can be executed by a computing device (e.g., a processor, processing circuit, and/or other suitable component) of a wireless communication apparatus, such as the UEs 104, 104', 104a, 104b, 350 and/or base station 102, 102', 102a, 102b, 310. As illustrated, the method 500 of wireless communication includes a number of enumerated steps, but aspects of the method 500 may include additional steps before, after, and in between the enumerated steps. In some aspects, one or more of the enumerated steps may be omitted or performed in a different order.

At step 510, the method 500 includes communicating, by the wireless communication apparatus (e.g., to another wireless communication apparatus or from another wireless communication apparatus), an indication that facilitates interference management by the wireless communication apparatus. At step 520, the method 500 includes receiving a combined signal using a spectrum shared among at least the wireless communication apparatus and an interfering entity. At step 530, the method 500 includes performing interference management on the received combined signal in accordance with the indication. In aspects, communicating, by the wireless communication apparatus, the indication that facilitates interference management by the wireless communication apparatus includes receiving from the interfering entity the indication that facilitates interference management by the wireless communication apparatus. In such aspects, performing interference management on the received combined signal in accordance with the indication includes performing at least one of interference suppression or interference cancellation in accordance with the indication.

In such aspects, the indication includes at least a reference signal (e.g., a user-specific reference signal, such as a demodulation reference signal and/or the like) configuration associated with the interfering entity. In such further aspects, the indication further includes a sequence allowing for timing synchronization. In such aspects, performing interference management on the received combined signal based on the indication includes estimating the interfering channel based on the reference signal configuration associated with the interfering entity.

In such aspects, the indication further includes at least one of a channel occupancy time for a communication associated with the interfering entity, or a modulation order for a communication associated with the interfering entity. In such further aspects, the indication further includes a sequence allowing for timing synchronization. In such aspects, performing interference management on the received combined signal in accordance with the indication includes estimating or decoding symbols of the interfering channel based on the at least one of the channel occupancy time for the communication associated with the interfering entity or the modulation order for the communication associated with the interfering entity.

In aspects, communicating, by the wireless communication apparatus, the indication that facilitates interference management by the wireless communication apparatus includes transmitting to the interfering entity the indication that facilitates interference management by the wireless communication apparatus. In such aspects, the indication further includes a channel occupancy time for a communication associated with the wireless communication apparatus. In such aspects, wherein the indication further includes a sequence allowing for timing synchronization. In such aspects, receiving the combined signal using a spectrum shared among at least the wireless communication apparatus and the interfering entity includes receiving, from the interfering entity, an interfering signal based on the indication. In such aspects, the indication includes an indication of an interference management capability of the wireless communication apparatus. In such further aspects, the interference management capability of the wireless communication apparatus includes an indication of a minimum mean square error (MMSE) interference suppression capability of the wireless communication apparatus. In such further aspects, the MMSE interference suppression capability includes an indication of a number of interfering streams the wireless communication apparatus may suppress.

In aspects, receiving the combined signal using a spectrum shared among at least the wireless communication apparatus and the interfering entity includes receiving a desired signal, and receiving an interfering signal aligned to a symbol boundary associated with the desired signal. In aspects, the wireless communication apparatus is associated with a first operator network and the interfering entity is associated with a second operator network. In such aspects, the first operator network and the second operator network are asynchronous.

In aspects, the wireless communication apparatus may be a UE and the interfering entity may be a base station. For example, the wireless communication apparatus may be a UE 104a associated with a first operator network 194a and the interfering entity may be a base station 102b associated with a second operator network 194b. In this manner, interference may be managed for spectrum sharing (e.g., while reducing and/or avoiding the problems associated with LBT procedures).

Figure 6:
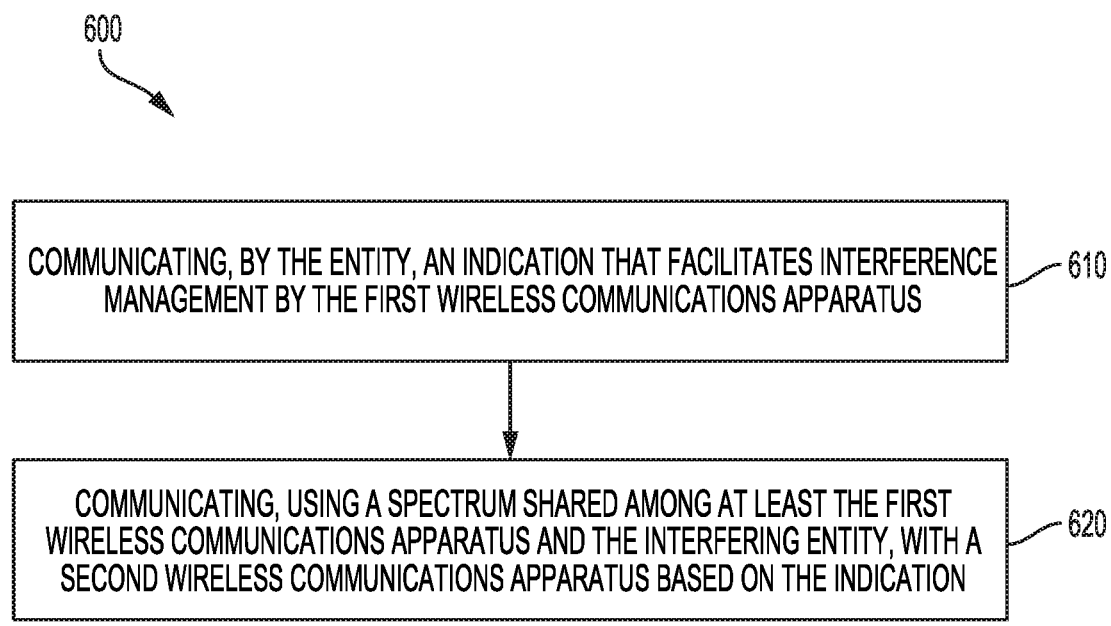
FIG. 6 is a flow diagram of another method of interference management for spectrum sharing in accordance with various aspects of the present disclosure.

FIG. 6 is a flow diagram of another method of interference management for spectrum sharing in accordance with various aspects of the present disclosure. The method of interference management for spectrum sharing may include a method of wireless communication by an entity interfering with a first wireless communication apparatus. Steps of the method 600 can be executed by a computing device (e.g., a processor, processing circuit, and/or other suitable component) of a wireless communication apparatus, such as the base stations 102, 102', 102a, 102b, 310. In aspects, steps of the method 600 can be executed by a computing device (e.g., a processor, processing circuit, and/or other suitable component) of a wireless communication apparatus, such as a UE 104, 104', 104a, 104b, 350. As illustrated, the method 600 of wireless communication includes a number of enumerated steps, but aspects of the method 600 may include additional steps before, after, and in between the enumerated steps. In some aspects, one or more of the enumerated steps may be omitted or performed in a different order.

At step 610, the method 600 includes communicating, by the entity (e.g., to the first wireless communication apparatus or from the first wireless communication apparatus), an indication that facilitates interference management by the first wireless communication apparatus. At step 620, the method 600 includes communicating, using a spectrum shared among at least the first wireless communication apparatus and the interfering entity, with a second wireless communication apparatus based on the indication. In aspects, the method 600 further includes determining, by the entity, the indication that facilitates interference management by the first wireless communication apparatus, wherein communicating, by the entity, the indication that facilitates interference management by the first wireless communication apparatus includes transmitting the indication that facilitates interference management to the first wireless communication apparatus.

In such aspects, the indication includes at least a reference signal configuration associated with the entity. In such further aspects, the indication further includes a sequence allowing for timing synchronization. In such aspects, the indication further includes at least one of a channel occupancy time for a communication associated with the interfering entity, or a modulation order for a communication associated with the interfering entity. In such further aspects, wherein the indication further includes a sequence allowing for timing synchronization.

In aspects, communicating, by the entity, the indication that facilitates interference management by the first wireless communication apparatus includes receiving by the interfering entity the indication that facilitates interference management by the first wireless communication apparatus.

In such further aspects, the indication includes an indication of an interference management capability of the first wireless communication apparatus. In such further aspects, the interference management capability of the first wireless communication apparatus includes an indication of a minimum mean square error (MMSE) interference suppression capability of the first wireless communication apparatus. In such further aspects, the MMSE interference suppression capability includes an indication of a number of interfering streams the first wireless communication apparatus may suppress. In such aspects, the indication further includes a channel occupancy time for a communication associated with the first wireless communication apparatus. In such aspects, the indication further includes a sequence allowing for timing synchronization. In such aspects, communicating, using a spectrum shared among at least the first wireless communication apparatus and the interfering entity, with the second wireless communication apparatus based on the indication includes transmitting a signal to the second wireless communication apparatus based on the indication. In such further aspects, transmitting the signal to the second wireless communication apparatus based on the indication includes transmitting the signal to the second wireless communication apparatus using a rank based on the indication.

In aspects, the first wireless communication apparatus is associated with a first operator network and the entity interfering with the first wireless communication apparatus is associated with a second operator network. In such aspects, the first operator network and the second operator network are asynchronous.

In this manner, interference may be managed for spectrum sharing (e.g., while reducing and/or avoiding the problems associated with LBT procedures).

Figure 7:
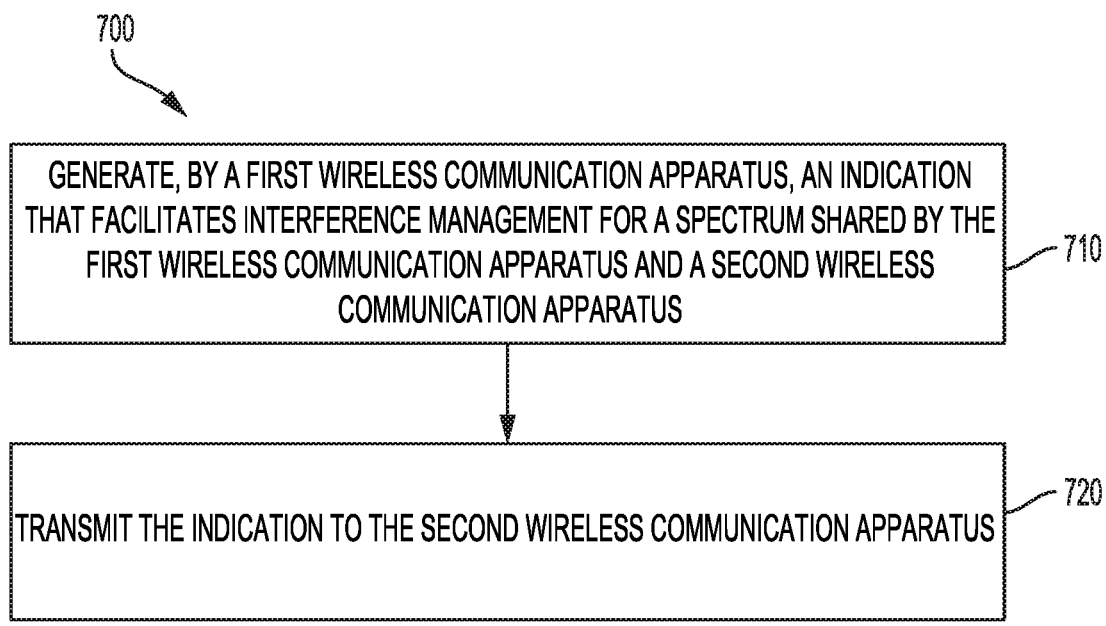
FIG. 7 is a flow diagram of another method of interference management for spectrum sharing in accordance with various aspects of the present disclosure.

FIG. 7 is a flow diagram of another method of interference management for spectrum sharing in accordance with various aspects of the present disclosure. The method of interference management for spectrum sharing may include a method of wireless communication by a first wireless communication apparatus. Steps of the method 700 can be executed by a computing device (e.g., a processor, processing circuit, and/or other suitable component) of a wireless communication apparatus, such as the base stations 102, 102', 102a, 102b, 310. In aspects, steps of the method 700 can be executed by a computing device (e.g., a processor, processing circuit, and/or other suitable component) of a wireless communication apparatus, such as a UE 104, 104', 104a, 104b, 350. As illustrated, the method 700 of wireless communication includes a number of enumerated steps, but aspects of the method 700 may include additional steps before, after, and in between the enumerated steps. In some aspects, one or more of the enumerated steps may be omitted or performed in a different order. The method 700 may encompass various aspects of indication 400, the method 500, and the method 600, described with reference to FIGS. 4-6 respectively.

At step 710, a first wireless communication apparatus may generate an indication that facilitates interference management for a spectrum shared by the first wireless communication apparatus and a second wireless communication apparatus. At step 720, The first wireless communication apparatus may transmit the indication to the second wireless communication apparatus.

The content of the indication may depend on whether the first wireless communication apparatus is an interfering entity or is an interfered entity with respect to the second wireless communication apparatus. If the first wireless communication apparatus is an interferer to the second wireless communication apparatus over the (shared) spectrum, the indication may contain one or more parameters on transmission characteristics of the first wireless communication apparatus, e.g., as described with reference to FIGS. 4 and 6. Such indication may be referred to as "transmitter signaling," as is signaled by a transmitter (at the first wireless communication apparatus) that causes interference to a receiver (at the second wireless communication apparatus). As illustrated in the message portion 402 of FIG. 4, the one or more parameters may include at least one of a configuration of reference signal transmission, a channel occupation time of data transmission, or a modulation order of data transmission, by the first wireless communication apparatus. The one or more parameters may facilitate receiver-side interference suppression by the second wireless communication apparatus. The second wireless communication apparatus (the interfered entity in this case) may suppress interference from the first wireless communication apparatus, using the one or more parameters received from the indication, e.g., as generally described with reference to FIGS. 4 and 6. For example, knowing the reference signal configuration (e.g., DMRS), the second wireless communication apparatus may be able to more accurately measure interference channel and thus may tune its MMSE filters to suppress interference coming from the directions of the interference channel.

On the other hand, if the second wireless communication apparatus is an interferer to the first wireless communication apparatus over the (shared) spectrum, the indication may contain one or more parameters on reception characteristics of the first wireless communication apparatus, e.g., as described with reference to FIGS. 4 and 5. Such indication may be referred to as "receiver signaling," as is signaled by a receiver (at the first wireless communication apparatus) that is interfered by a transmitter (at the second wireless communication apparatus). As illustrated in the message portion 402 of FIG. 4, the one or more parameters may include an interference suppression capability (e.g., MMSE interference suppression capability) of the first wireless communication apparatus. The one or more parameters may facilitate transmitter-side interference mitigation by the second wireless communication apparatus. The second wireless communication apparatus (the interfering entity in this case) may mitigate its interference to the first wireless communication apparatus, using the one or more parameters received from the indication, e.g., as generally described with reference to FIGS. 4 and 5. For example, knowing the MMSE suppression capacity (e.g., which ranks or particular directions of the interference the receiver may suppress), the second wireless communication apparatus may limit the rank of its transmission.

As generally described with reference to FIGS. 5 and 6, the above aspects may be combined in a single entity (e.g., the first or second wireless communication apparatus). A wireless communication apparatus may be both interfering to and interfered by another wireless communication apparatus. For example, the first wireless communication apparatus may transmit both a transmitter-side, interference management indication and a receiver-side, interference management indication to the second wireless communication apparatus. In addition, a wireless communication apparatus may transmit and receive interference management indications to and from another wireless communication apparatus. For example, the first wireless communication apparatus may transmit an interference management indication to the second wireless communication apparatus to help the later suppress interference, while adapting its transmission to mitigate interference based on an interference management indication received from the later.

In various aspects, the interference management indication may additionally include a timing synchronization preamble, e.g., as illustrated by preamble portion 404 of FIG. 4. The timing synchronization preamble may be generated based on a timing synchronization sequence, which can be detected by the first and/or second wireless communication apparatus to allow for timing synchronization. Timing synchronization may provide many advantages for interference management, especially across different nodes or operators. For example, MMSE (or other forms of) interference suppression may work better when the interference is time-aligned (e.g., with respect to OFDM symbol boundary) with the desired signal.

Figure 8:
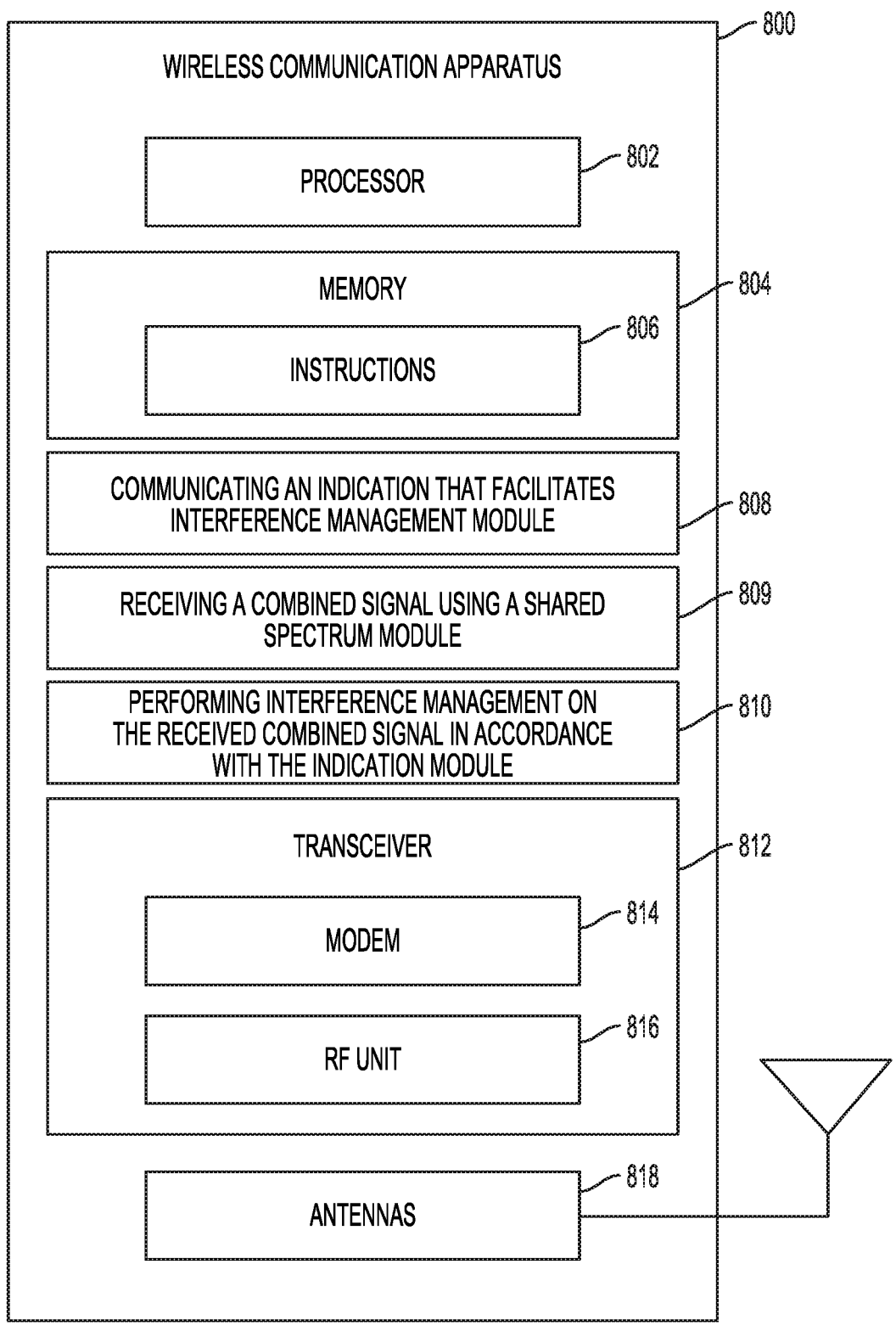
FIG. 8 is a block diagram of an exemplary wireless communication apparatus in accordance with aspects of the present disclosure.

FIG. 8 is a block diagram of an exemplary wireless communication apparatus in accordance with aspects of the present disclosure. In aspects, the wireless communication apparatus 800 may be a UE 104, 104', 104a, 104b, 350, as discussed above, for example. In aspects, the wireless communication apparatus 800 may be a BS 102, 102', 102a, 102b, 310, as discussed above, for example. As shown, the wireless communication apparatus 800 may include a processor 802, a memory 804, communicating an indication that facilitates interference management module 808, a receiving a combined signal using a spectrum shared module 809, a performing interference management on the received combined signal in accordance with the indication module 810, a transceiver 812 including a modem subsystem 814 and a radio frequency (RF) unit 816, and one or more antennas 818. These elements may be in direct or indirect communication with each other, for example via one or more buses.

The processor 802 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store instructions 806. The instructions 806 may include instructions that, when executed by the processor 802, cause the processor 802 to perform the operations, such as methods 500 described herein with reference to one or more of the UEs 104, 104', 104a, 104b, 350 and/or with reference to one or more of the BSs 102, 102', 102a, 102b, 310 in connection with aspects of the present disclosure. Instructions 1006 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communicating an indication that facilitates interference management module 808, the receiving a combined signal using a spectrum shared module 809, and/or the performing interference management on the received combined signal in accordance with the indication module 810 may be used for various aspects of the present disclosure. For example, the communicating an indication that facilitates interference management module 808 may communicate, by the wireless communication apparatus 800, an indication that facilitates interference management by the wireless communication apparatus. The receiving a combined signal using a spectrum shared module 809 may receive a combined signal using a spectrum shared among at least the wireless communication apparatus 800 and an interfering entity. The performing interference management on the received combined signal in accordance with the indication module 810 may perform interference management on the received combined signal in accordance with the indication.

As shown, the transceiver 812 may include the modem subsystem 814 and the RF unit 816. The transceiver 812 can be configured to communicate bi-directionally with other devices, such as the BSs 102, 102', 102a, 102b, 310 and/or UEs 104, 104', 104a, 104b, 350. The modem subsystem 814 may be configured to modulate and/or encode the data from the memory 804, the communicating an indication that facilitates interference management module 808, the receiving a combined signal using a spectrum shared module 809, and/or the performing interference management on the received combined signal in accordance with the indication module 810 according to a modulation and coding scheme (MCS), e.g., a low-density parity check (LDPC) coding scheme, a turbo coding scheme, a convolutional coding scheme, a digital beamforming scheme, etc. The RF unit 816 may be configured to process (e.g., perform analog to digital conversion or digital to analog conversion, etc.) modulated/encoded data from the modem subsystem 814 (on outbound transmissions) or of transmissions originating from another source such as a UE 104, 104', 104a, 104b, 350 or a BS 102, 102', 102a, 102b, 310. The RF unit 816 may be further configured to perform analog beamforming in conjunction with the digital beamforming. Although shown as integrated together in transceiver 812, the modem subsystem 814 and the RF unit 816 may be separate devices that are coupled together at the wireless communication apparatus 800 to enable the wireless communication apparatus 800 to communicate with other devices.

The RF unit 816 may provide the modulated and/or processed data, e.g. data packets (or, more generally, data messages that may contain one or more data packets and other information), to the antennas 818 for transmission to one or more other devices. This may include, for example, transmission of an indication that facilitates interference management by the wireless communications apparatus 800, according to aspects of the present disclosure. The antennas 818 may further receive data messages transmitted from other devices. This may include, for example, receiving transmission of an indication that facilitates interference management by the wireless communications apparatus 800, according to aspects of the present disclosure. The antennas 818 may provide the received data messages for processing and/or demodulation at the transceiver 812. The antennas 818 may include multiple antennas of similar or different designs in order to sustain multiple transmission links. The RF unit 816 may configure the antennas 818. In aspects, the wireless communication apparatus 800 may be a UE 104, 104', 104a, 104b, 350, 450, and one or more of any of the components of the UE 104, 104', 104a, 104b, 350, 450 may perform interference management for spectrum sharing as described herein. In aspects, the wireless communication apparatus 800 may be a base station 102, 102', 102a, 102b, 310 and one or more of any of the components of the base station 102, 102', 102a, 102b, 310 may perform interference management for spectrum sharing as described herein.

FIG. 8 is provided as an example. Other examples are possible and may differ from what was described in connection with FIG. 8.

Figure 9:
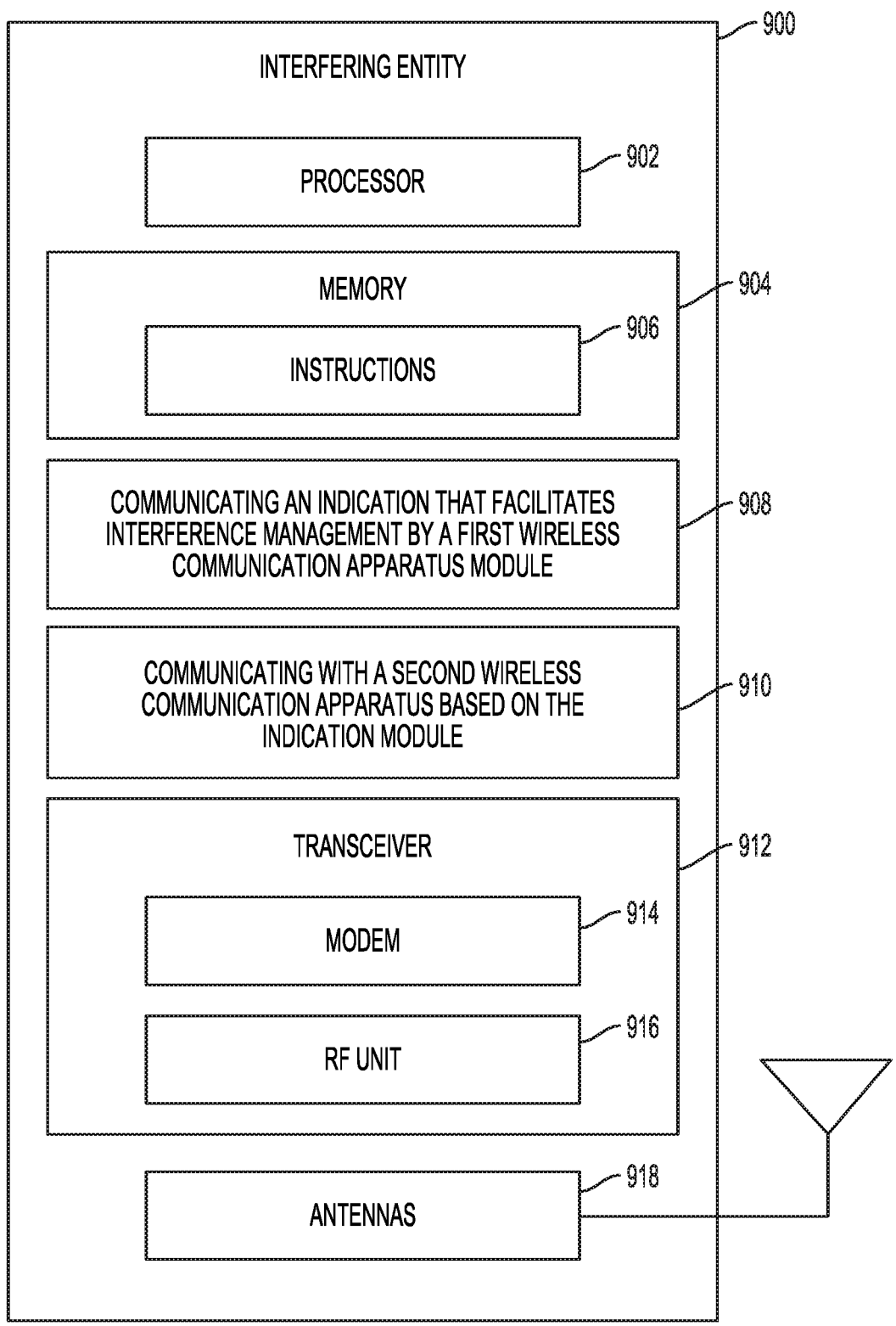
FIG. 9 is another block diagram of an exemplary wireless communication apparatus in accordance with aspects of the present disclosure.

FIG. 9 is another block diagram of an exemplary wireless communication apparatus in accordance with aspects of the present disclosure. The wireless communication apparatus may be an interfering entity 900. In aspects, interfering entity 900 may be a BS 102, 102', 102a, 102b, 310, as discussed above, for example. In aspects, the interfering entity 900 may be a UE 104, 104', 104a, 104b, 350, as discussed above, for example. As shown, the interfering entity may include a processor 902, a memory 904, a communicating an indication that facilitates interference management by a first wireless communication apparatus module 908, a communicating with a second wireless communication apparatus based on the indication module 910, a transceiver 912 including a modem subsystem 914 and a radio frequency (RF) unit 916, and one or more antennas 918. These elements may be in direct or indirect communication with each other, for example via one or more buses.

The processor 902 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store instructions 906. The instructions 906 may include instructions that, when executed by the processor 902, cause the processor 902 to perform the operations, such as methods 600 described herein with reference to one or more of the BSs 102, 102', 102a, 102b, 310 and/or with reference to one or more of the UEs 104, 104', 104a, 104b, 350 in connection with aspects of the present disclosure. Instructions 906 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communicating an indication that facilitates interference management by a first wireless communication apparatus module 908 and/or the communicating with a second wireless communication device based on the indication module 910 may be used for various aspects of the present disclosure. For example, the communicating an indication that facilitates interference management by a first wireless communication apparatus module 908 may communicate, by the entity 900, an indication that facilitates interference management by the first wireless communication apparatus. The communicating with a second wireless communication device based on the indication module 910 may communicate, using a spectrum shared among at least the first wireless communication apparatus and an interfering entity 900, with a second wireless communication apparatus based on the indication.

As shown, the transceiver 912 may include the modem subsystem 914 and the RF unit 916. The transceiver 912 can be configured to communicate bi-directionally with other devices, such as UEs 104, 104', 104a, 104b, 350 and/or the BSs 102, 102', 102a, 102b, 310. The modem subsystem 914 may be configured to modulate and/or encode the data from the memory 904, the communicating an indication that facilitates interference management by a first wireless communication apparatus module 908 and/or the communicating with a second wireless communication device based on the indication module 910 according to a modulation and coding scheme (MCS), e.g., a low-density parity check (LDPC) coding scheme, a turbo coding scheme, a convolutional coding scheme, a digital beamforming scheme, etc. The RF unit 916 may be configured to process (e.g., perform analog to digital conversion or digital to analog conversion, etc.) modulated/encoded data from the modem subsystem 914 (on outbound transmissions) or of transmissions originating from another source such as a UE 104, 104', 104a, 104b, 350 or a BS 102, 102', 102a, 102b, 310. The RF unit 916 may be further configured to perform analog beamforming in conjunction with the digital beamforming. Although shown as integrated together in transceiver 912, the modem subsystem 914 and the RF unit 916 may be separate devices that are coupled together at the interfering entity 900 to enable the interfering entity 900 to communicate with other devices.

The RF unit 916 may provide the modulated and/or processed data, e.g. data packets (or, more generally, data messages that may contain one or more data packets and other information), to the antennas 918 for transmission to one or more other devices. This may include, for example, transmission of an indication that facilitates interference management by a wireless communication apparatus, according to aspects of the present disclosure. The antennas 918 may further receive data messages transmitted from other devices. This may include, for example, receiving transmission of an indication that facilitates interference management by a wireless communication apparatus, according to aspects of the present disclosure. The antennas 918 may provide the received data messages for processing and/or demodulation at the transceiver 912. The antennas 918 may include multiple antennas of similar or different designs in order to sustain multiple transmission links. The RF unit 916 may configure the antennas 918. In aspects, the interfering entity 900 may be a base station 102, 102', 102a, 102b, 310, and one or more of any of the components of the base station 102, 102', 102a, 102b, 310 may perform interference management for spectrum sharing as described herein. In aspects, the interfering entity 900 may be a wireless communication apparatus like a UE 104, 104', 104a, 104b, 350, 450, and one or more of any of the components of the UE 104, 104', 104a, 104b, 350, 450 may perform interference management for spectrum sharing as described herein.

FIG. 9 is provided as an example. Other examples are possible and may differ from what was described in connection with FIG. 9.

Figure 10:
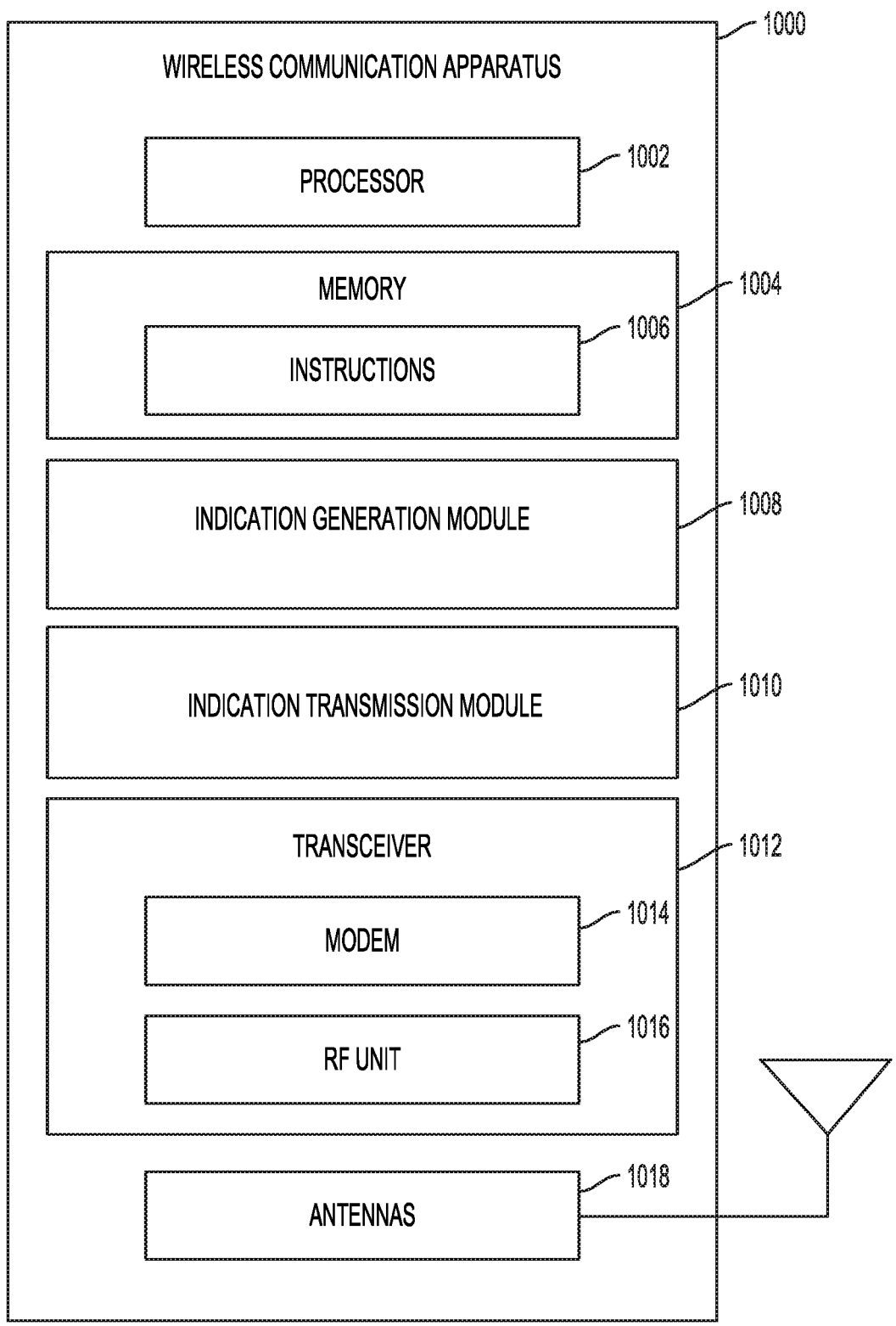
FIG. 10 is another block diagram of an exemplary wireless communication apparatus in accordance with aspects of the present disclosure.

FIG. 10 is another block diagram of an exemplary wireless communication apparatus in accordance with aspects of the present disclosure. In aspects, the wireless communication apparatus 1000 may be a UE 104, 104', 104a, 104b, 350, as discussed above, for example. In aspects, the wireless communication apparatus 100 may be a BS 102, 102', 102a, 102b, 310, as discussed above, for example. As shown, the wireless communication apparatus 100 may be a first wireless communication apparatus that include a processor 1002, a memory 1004, an indication generation module 1008, an indication transmission module 1010, a transceiver 1012 including a modem subsystem 1014 and a radio frequency (RF) unit 1016, and one or more antennas 1018. These elements may be in direct or indirect communication with each other, for example via one or more buses.

The processor 1002 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1004 includes a non-transitory computer-readable medium. The memory 1004 may store instructions 1006. The instructions 1006 may include instructions that, when executed by the processor 1002, cause the processor 1002 to perform the operations, such as methods 700 described herein with reference to one or more of the UEs 104, 104', 104a, 104b, 350 and/or with reference to one or more of the BSs 102, 102', 102a, 102b, 310 in connection with aspects of the present disclosure. Instructions 1006 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The indication generation module 1008 and/or indication transmission module 1010 may be used for various aspects of the present disclosure. For example, the indication generation module 1008 may be configured to generate an indication that facilitates interference management for a spectrum shared by the first wireless communication apparatus and a second wireless communication apparatus. The indication transmission module 1010 may transmit the indication to the second wireless communication apparatus.

As shown, the transceiver 1012 may include the modem subsystem 1014 and the RF unit 1016. The transceiver 1012 can be configured to communicate bi-directionally with other devices, such as the BSs 102, 102', 102a, 102b, 310 and/or UEs 104, 104', 104a, 104b, 350. The modem subsystem 1014 may be configured to modulate and/or encode the data from the memory 1004, the indication generation module 1008 and/or the indication transmission module 1010 according to a modulation and coding scheme (MCS), e.g., a low-density parity check (LDPC) coding scheme, a turbo coding scheme, a convolutional coding scheme, a digital beamforming scheme, etc. The RF unit 1016 may be configured to process (e.g., perform analog to digital conversion or digital to analog conversion, etc.) modulated/encoded data from the modem subsystem 1014 (on outbound transmissions) or of transmissions originating from another source such as a UE 104, 104', 104a, 104b, 350 or a BS 102, 102', 102a, 102b, 310. The RF unit 1016 may be further configured to perform analog beamforming in conjunction with the digital beamforming. Although shown as integrated together in transceiver 1012, the modem subsystem 1014 and the RF unit 1016 may be separate devices that are coupled together at the wireless communication apparatus 1000 to enable the wireless communication apparatus 1000 to communicate with other devices.

The RF unit 1016 may provide the modulated and/or processed data, e.g. data packets (or, more generally, data messages that may contain one or more data packets and other information), to the antennas 1018 for transmission to one or more other devices. This may include, for example, transmission of an indication that facilitates interference management by the wireless communication apparatus 1000, according to aspects of the present disclosure. The antennas 1018 may further receive data messages transmitted from other devices. This may include, for example, receiving, by the first wireless communications apparatus 1000, transmission of another indication that facilitates interference management, according to aspects of the present disclosure. The antennas 1018 may provide the received data messages for processing and/or demodulation at the transceiver 1012. The antennas 1018 may include multiple antennas of similar or different designs in order to sustain multiple transmission links. The RF unit 1016 may configure the antennas 1018. In aspects, the wireless communication apparatus 1000 may be a UE 104, 104', 104a, 104b, 350, 450, and one or more of any of the components of the UE 104, 104', 104a, 104b, 350, 450 may perform interference management for spectrum sharing as described herein. In aspects, the wireless communication apparatus 1000 may be a base station 102, 102', 102a, 102b, 310 and one or more of any of the components of the base station 102, 102', 102a, 102b, 310 may perform interference management for spectrum sharing as described herein. In aspects, the wireless communication apparatus 1000 may be a first wireless communication apparatus that causes interference to a second wireless communication apparatus. In aspects, the wireless communication apparatus 1000 may be a first wireless communication apparatus that is caused interference by a second wireless communication apparatus.

FIG. 10 is provided as an example. Other examples are possible and may differ from what was described in connection with FIG. 10.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first wireless communication apparatus, comprising:
generating an indication that facilitates management of interference between the first wireless communication apparatus and a second wireless communication apparatus over a shared spectrum, wherein the indication includes a preamble portion and a message portion; and
transmitting the indication to the second wireless communication apparatus.

2. The method of claim 1, wherein the first wireless communication apparatus is an interferer to the second wireless communication apparatus over the spectrum.

3. The method of claim 2, wherein the message portion comprises one or more parameters on transmission characteristics of the first wireless communication apparatus.

4. The method of claim 3, wherein the one or more parameters comprise at least one of a configuration of reference signal transmission, a channel occupation time of data transmission, or a modulation order of data transmission, by the first wireless communication apparatus.

5. The method of claim 3, wherein the one or more parameters facilitate receiver-side interference suppression by the second wireless communication apparatus.

6. The method of claim 1, wherein the second wireless communication apparatus is an interferer to the first wireless communication apparatus over the spectrum.

7. The method of claim 6, wherein the message portion comprises one or more parameters on reception characteristics of the first wireless communication apparatus.

8. The method of claim 7, wherein the one or more parameters comprise an interference suppression capability of the first wireless communication apparatus.

9. The method of claim 7, wherein the one or more parameters facilitate transmitter-side interference mitigation by the second wireless communication apparatus.

10. The method of claim 1, wherein the preamble portion comprises a timing synchronization preamble.

11. A first wireless communication apparatus, comprising:
a memory; and
at least one processor coupled to the memory, the at least one processor configured to:
generate an indication that facilitates management of interference between the first wireless communication apparatus and a second wireless communication apparatus over a shared spectrum, wherein the indication includes a preamble portion and a message portion; and
transmit the indication to the second wireless communication apparatus.

12. The first wireless communication apparatus of claim 11, wherein the first wireless communication apparatus is an interferer to the second wireless communication apparatus over the spectrum.

13. The first wireless communication apparatus of claim 12, wherein the message portion comprises one or more parameters on transmission characteristics of the first wireless communication apparatus.

14. The first wireless communication apparatus of claim 13, wherein the one or more parameters comprise at least one of a configuration of reference signal transmission, a channel occupation time of data transmission, or a modulation order of data transmission, by the first wireless communication apparatus.

15. The first wireless communication apparatus of claim 13, wherein the one or more parameters facilitate receiver-side interference suppression by the second wireless communication apparatus.

16. The first wireless communication apparatus of claim 11, wherein the second wireless communication apparatus is an interferer to the first wireless communication apparatus over the spectrum.

17. The first wireless communication apparatus of claim 16, wherein the message portion comprises one or more parameters on reception characteristics of the first wireless communication apparatus.

18. The first wireless communication apparatus of claim 17, wherein the one or more parameters comprise an interference suppression capability of the first wireless communication apparatus.

19. The first wireless communication apparatus of claim 17, wherein the one or more parameters facilitate transmitter-side interference mitigation by the second wireless communication apparatus.

20. The first wireless communication apparatus of claim 11, wherein the preamble portion comprises a timing synchronization preamble.

21. A first wireless communication apparatus, comprising:

means for generating an indication that facilitates management of interference between the first wireless communication apparatus and a second wireless communication apparatus over a shared spectrum, wherein the indication includes a preamble portion and a message portion; and means for transmitting the indication to the second wireless communication apparatus.

22. The first wireless communication apparatus of claim 21, wherein the first wireless communication apparatus is an interferer to the second wireless communication apparatus over the spectrum.

23. The first wireless communication apparatus of claim 22, wherein the message portion comprises one or more parameters on transmission characteristics of the first wireless communication apparatus.

24. The first wireless communication apparatus of claim 21, wherein the second wireless communication apparatus is an interferer to the first wireless communication apparatus over the spectrum.

25. The first wireless communication apparatus of claim 24, wherein the message portion comprises one or more parameters on reception characteristics of the first wireless communication apparatus.

26. A non-transitory computer-readable medium having instructions stored thereon which comprises codes executable for a first wireless communication apparatus to perform:

generating an indication that facilitates management of interference between the first wireless communication apparatus and a second wireless communication apparatus over a shared spectrum, wherein the indication includes a preamble portion and a message portion; and transmitting the indication to the second wireless communication apparatus.

27. The non-transitory computer-readable medium of claim 26, wherein the first wireless communication apparatus is an interferer to the second wireless communication apparatus over the spectrum.

28. The non-transitory computer-readable medium of claim 27, wherein the message portion comprises one or more parameters on transmission characteristics of the first wireless communication apparatus.

29. The non-transitory computer-readable medium of claim 26, wherein the second wireless communication apparatus is an interferer to the first wireless communication apparatus over the spectrum.

30. The non-transitory computer-readable medium of claim 29, wherein the message portion comprises one or more parameters on reception characteristics of the first wireless communication apparatus.

* * * * *